US006301423B1

United States Patent
Olson

(10) Patent No.: US 6,301,423 B1
(45) Date of Patent: Oct. 9, 2001

(54) METHOD FOR REDUCING STRAIN ON BRAGG GRATINGS

(75) Inventor: Grieg A. Olson, Austin, TX (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/525,719

(22) Filed: Mar. 14, 2000

(51) Int. Cl.[7] .................................................. G02B 6/00
(52) U.S. Cl. ............................ 385/135; 385/12; 385/134; 385/137
(58) Field of Search .................................. 385/12, 17, 134, 385/135, 136, 137

(56) References Cited

U.S. PATENT DOCUMENTS

| | | | |
|---|---|---|---|
| 4,907,854 | * | 3/1990 | Nakasone et al. ................. 350/96.23 |
| 5,042,898 | | 8/1991 | Morey et al. ............................ 385/37 |
| 5,715,265 | | 2/1998 | Epworth .................................. 372/38 |
| 5,887,107 | * | 3/1999 | Newman et al. ..................... 385/137 |
| 6,044,189 | | 3/2000 | Miller ...................................... 385/37 |

FOREIGN PATENT DOCUMENTS

| | | |
|---|---|---|
| 0 766 359 B1 | 7/1999 | (EP) . |
| WO 98/59267 | 12/1998 | (WO) . |

* cited by examiner

*Primary Examiner*—John D. Lee
*Assistant Examiner*—Jennifer Doan
(74) *Attorney, Agent, or Firm*—John A. Fortkort; Néstor F. Ho

(57) ABSTRACT

A method is provided for securing an optical fiber Bragg grating to a retaining element having a helical groove. In accordance with the method, an optical fiber Bragg grating is wrapped around the retaining element so that the optical fiber Bragg grating extends in and along the helical groove. Next, an excess length of the optical fiber Bragg grating is provided in the helical groove to substantially alleviate tension exerted upon the optical fiber Bragg grating. Finally, the first and second ends of the fiber Bragg grating are affixed to the retaining element.

20 Claims, 5 Drawing Sheets

METHOD FOR REDUCING STRAIN ON BRAGG GRATINGS

FIELD OF THE INVENTION

The present invention relates generally to methods for reducing strain on optical fiber Bragg gratings, and more particularly, to methods for reducing the strain imposed on the fiber grating as the ambient temperature fluctuates.

BACKGROUND OF THE INVENTION

A conventional Bragg grating comprises an optical fiber in which the index of refraction undergoes periodic perturbations along its length. The perturbations may be equally spaced, as in the case of an unchirped grating, or may be unequally spaced, as in the case of a chirped grating. The fiber grating reflects light over a given waveband centered around a wavelength equal to twice the spacing between successive perturbations. The remaining wavelengths pass essentially unimpeded. Such fiber Bragg gratings are typically employed in a variety of applications including filtering, stabilization of semiconductor lasers, reflection of fiber amplifier pump energy, and compensation for fiber dispersion.

Fiber gratings are typically mounted on a substrate or wound around a retaining element, which are in turn secured in a housing. Since the fiber grating and the substrate or retaining element generally have different thermal coefficients of expansion, the fiber grating will typically be under tension or stress as the ambient temperature fluctuates. To prolong the expected lifetime of the fiber grating, however, the grating ideally should be packaged in such a way that it is under minimal stress.

Packages for fiber grating often address temperature fluctuations because both the refractive index of the grating and the distance between successive perturbations are temperature dependent. As a result, the reflected waveband is also temperature dependent. In many cases, however, it is desirable to provide a stabilized reflection band that is temperature independent. In other cases, it is sufficient to maintain the entire length of the fiber grating at a uniform temperature so that, while the reflected waveband may be shifted, it will not also be distorted. Copending Appl. Serial No. 09/524, 862 entitled "Thermally Managed Package for Fiber Optic Bragg Gratings" and filed on even date herewith, discloses a package for an optical fiber Bragg grating that includes a retaining element about which the optical fiber is wound. A housing is provided which is adapted to receive the retaining element therein. The housing has a relatively low thermal conductivity and the retaining element has a relatively high thermal conductivity. Such an arrangement ensures that the temperature of the Bragg grating remains substantially uniform even when the ambient temperature undergoes substantial fluctuations. For example, if the exterior of the housing is heated nonuniformly, the low conductivity material from which the housing is formed will appreciably reduce the rate of heat flow into the interior of the housing. Moreover, the heat that does penetrate the housing will be rapidly spread over the entire length of the fiber Bragg grating by the high conductivity member. As a result, the grating will quickly reach a new equilibrium temperature that is uniform along its entirety. Unfortunately, the grating package disclosed in this reference does not also prevent the fiber grating from experiencing substantial strain as the ambient temperature fluctuates.

Accordingly, it would be desirable to provide a package for a fiber Bragg grating such as shown in the previously mentioned patent application, which reduces the strain experienced by the grating as the ambient temperature fluctuates.

SUMMARY OF THE INVENTION

In one aspect, the present invention relates to a method for securing an optical fiber Bragg grating to a retaining element equipped with a helical groove. In accordance with the method, an optical fiber Bragg grating is wrapped around the retaining element so that the optical fiber Bragg grating extends in and along the helical groove. Next, an excess length of the optical fiber Bragg grating is provided in the helical groove to substantially alleviate tension exerted upon the optical fiber Bragg grating. Finally, the first and second ends of the fiber Bragg grating are affixed to the retaining element.

In some embodiments of the present invention, the step of providing the excess length of fiber includes the step of wrapping the Bragg grating around the retaining element so that substantially no tension is exerted upon the Bragg grating until a maximum temperature is exceeded. In some cases, the maximum temperature corresponds to a maximum operating temperature of optical fiber Bragg grating.

In other embodiments of the present invention, the step of providing the excess length of fiber includes the steps of securing a spacing element across a plurality of lays of the helical groove, and the wrapping step includes the step of wrapping the optical fiber Bragg grating around both the retaining element and the spacing element so that the optical fiber Bragg grating extends in and along the helical groove.

In still other embodiments of the present invention, the spacing element may be removed after affixing the first and second ends of the fiber Bragg grating to the retaining element.

In other embodiments of the present invention, the spacing element is generally cylindrical in shape. Moreover, the helical groove may be located in an outer surface of the retaining element and the cylindrical spacing element may have a portion of its circumferential surface that conforms to the outer surface of the retaining element.

In another aspect, the present invention relates to a package for an optical fiber Bragg grating. The package includes a retaining element that supports the optical fiber Bragg grating. The retaining element has a helical groove in which the optical fiber extends. The optical fiber is arranged in the groove so that tension exerted upon the optical fiber Bragg grating is substantially alleviated. A housing is also provided which is adapted to receive the retaining element therein.

DETAILED DESCRIPTION

Figure 1:
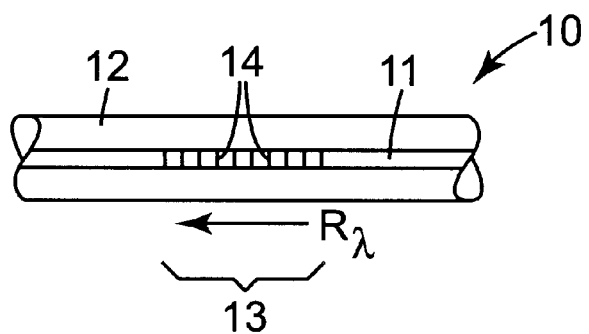
FIG. 1 shows an exemplary optical fiber Bragg grating.

Referring now to the drawings and in particular to FIG. 1 thereof, an optical waveguide 10 is shown to be configured as an optical fiber of which only a relatively short longitudinal portion is depicted and which includes a fiber core 11 and a fiber cladding 12 surrounding the fiber core. The fiber core incorporates a grating region 13 that includes a multitude of grating elements 14 each extending substantially normal to the longitudinal axis of the core. If the grating is unchirped, the grating elements are equidistantly spaced from one another as considered in the longitudinal direction of the optical fiber. Alternatively, if the grating is to be chirped, the spacing between grating elements will vary in a predetermined manner.

Figure 3:
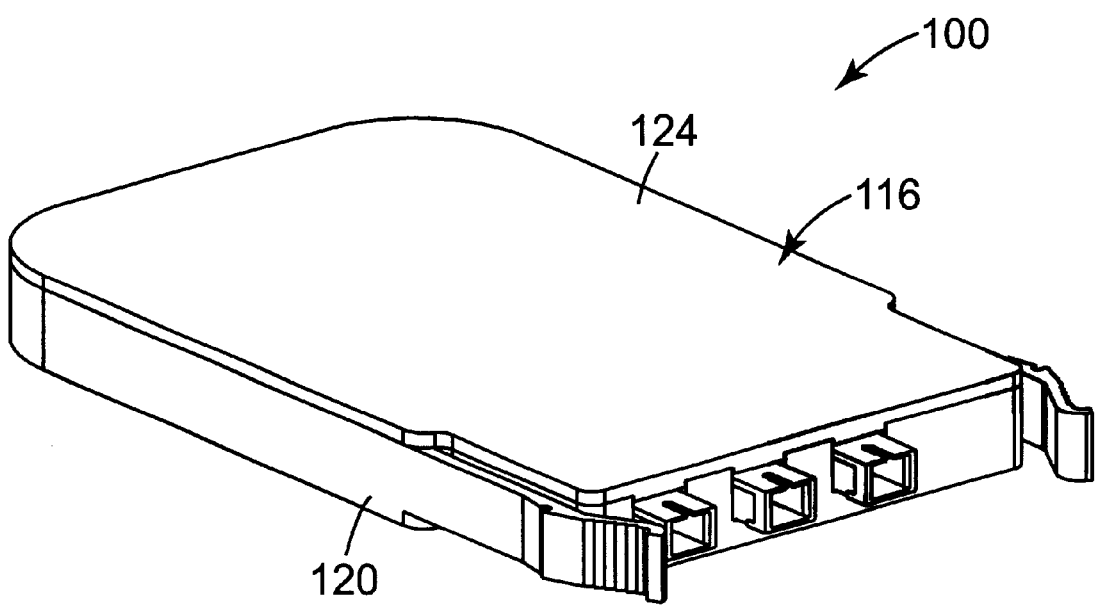
FIG. 3 shows a perspective view of the exterior of the package shown in FIG. 2.
Figure 2:
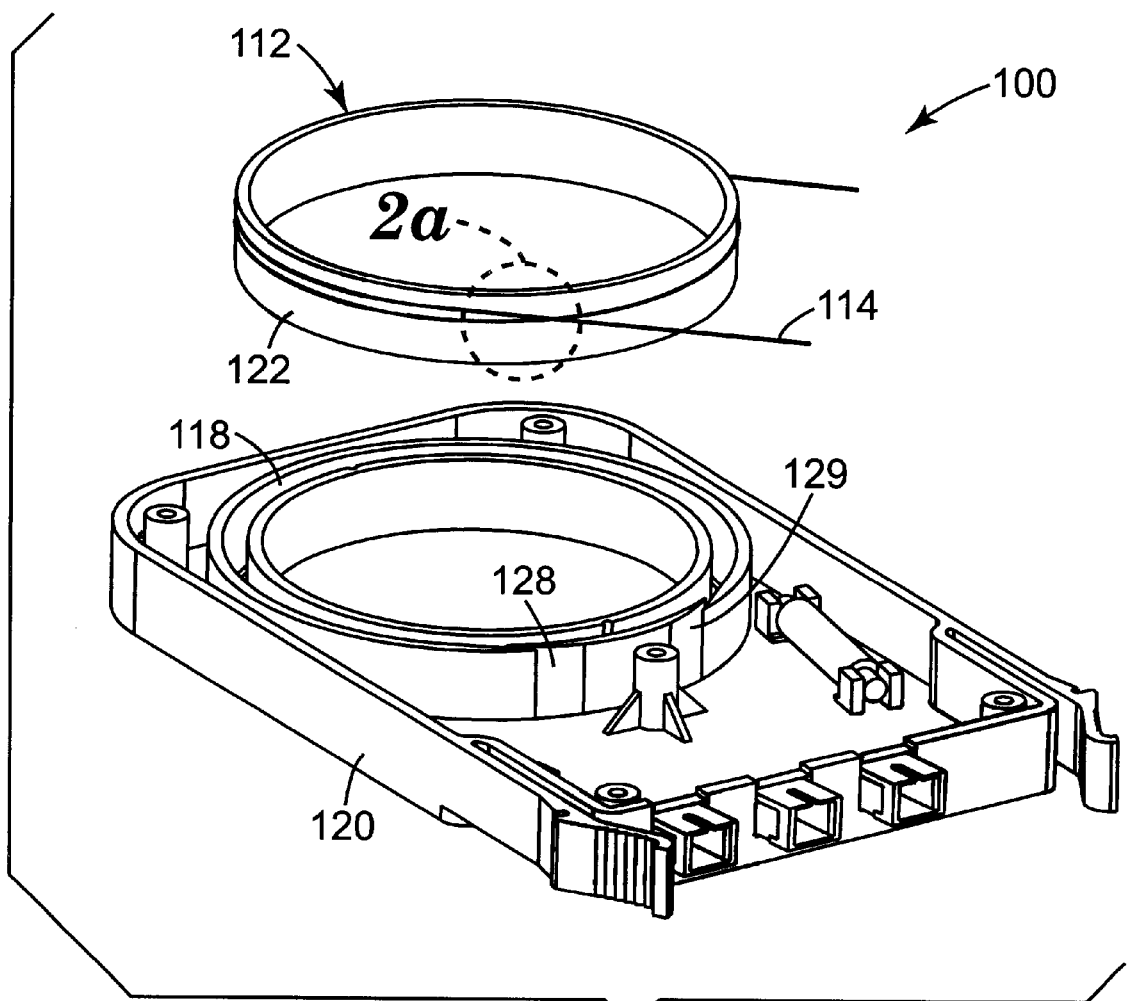
FIG. 2 shows a perspective view of the interior of one embodiment of a package for containing a Bragg grating fiber constructed in accordance with the present invention.
Figure 2A:
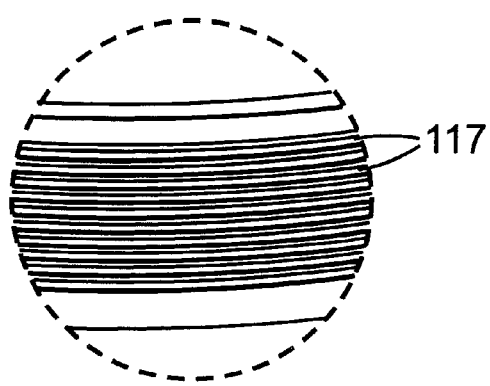

FIGS. 2 and 3 are perspective views of one embodiment of an optical fiber having a Bragg grating package 100 constructed in accordance with the present invention. For the remainder of this description. The optical fiber having a Bragg grating will be referred to as "fiber grating". The package includes a retaining element 112 that holds the fiber grating 114 in a helical groove 117 located on the outer surface of the retaining element. In the embodiment depicted in FIG. 2, the retaining element is formed as a ring or cylinder that has an outer circumferential surface 122 in which the helical groove is inscribed. Of course, one of ordinary skill in the art will appreciate that the retaining element need not be cylindrical in shape. For example, the retaining element may have a cross-section that is elliptical or some other non-circular shape. Preferably, however, the retaining element is devoid of sharp corners and is provided with a generally convex outer surface in which the helical groove may be inscribed. Furthermore, the retaining element need not have an interior that is hollow or has a hollow annular region.

The retaining element may be secured in a housing 116 that protects the fiber grating, as shown in FIG. 3. In the embodiment of the invention shown in FIGS. 2 and 3, the housing includes first and second portions 120 and 124 that engage with one another to form a cavity therein. The first and second portions of the housing may be connected together by any convenient means, including fasteners, hinges or the like. The interior of the housing accommodates a retaining element 112. For example, in the embodiment of the invention depicted in FIG. 2, the retaining element slides into a circular groove 118 located in the first or bottom portion of the housing. If the housing is formed from a plastic material, the circular groove may be integrally formed with the housing. When retaining element is positioned in the circular groove, the fiber grating exits the circular groove via slots 128 or 129. The slots may extend the full width of the groove, or alternatively, may extend only a portion of the width of the groove.

Figure 4A:
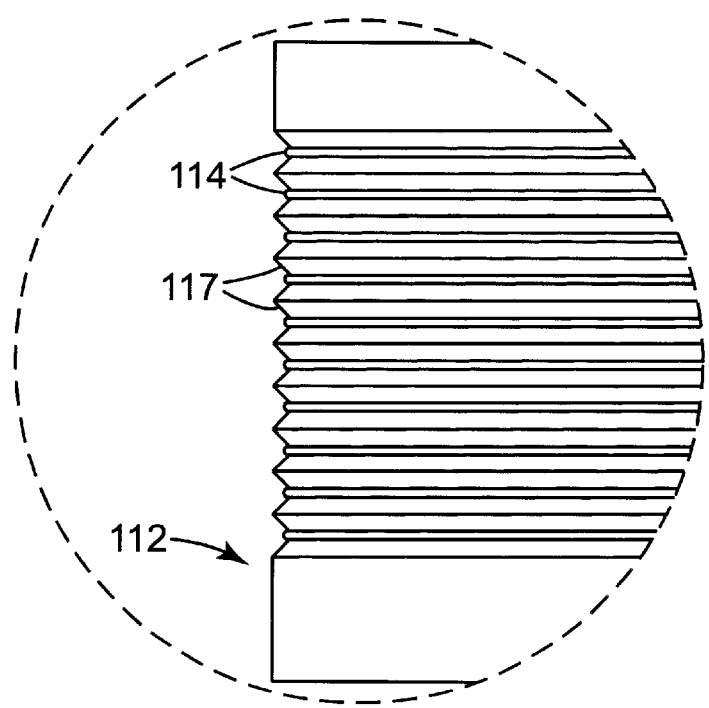
FIG. 4(a) shows a detailed view of a portion of the retaining element illustrating the helical groove.
Figure 4B:
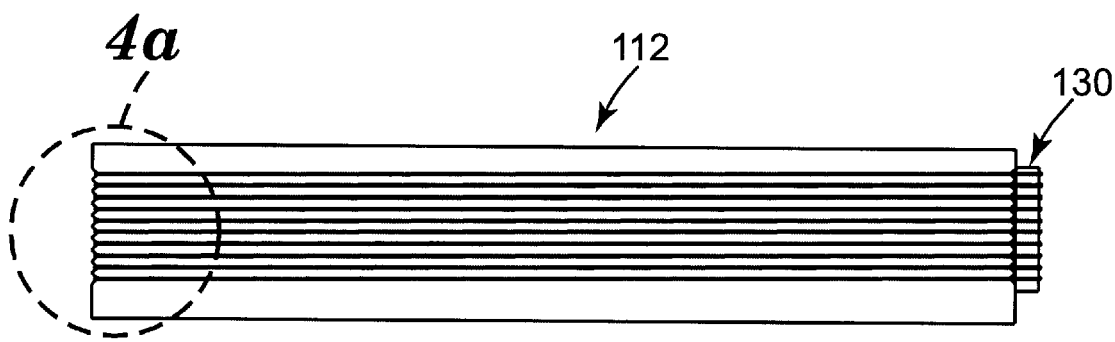
FIG. 4(b) shows the complete retaining element that is partially illustrated in FIG. 4(a)

FIG. 4(a) shows a detailed view of a portion of the retaining element 112, which is fully shown in FIG. 4(b). As shown, the helical groove 117 in which the fiber 114 is situated is V-shaped. As previously mentioned, the fiber grating should be secured to the retaining element with a minimum of stress to prolong the grating lifetime. In FIG. 4(a), the fiber grating is shown tightly wrapped in the groove so that the fiber 114 is situated at the bottom or innermost portion of the groove.

In accordance with the present invention, the stress imposed on the fiber grating is alleviated by ensuring that the fiber grating is loosely wrapped around the retaining element, yet remains within the groove. This result may be accomplished in a variety of different ways. For example, with reference to FIGS. 4(b) and 4(c), a spacing element 130 may be secured to the retaining element prior to wrapping the grating into the groove 117. The spacing element has a length that allows it to extend across each lay of the groove. That is, as shown in FIG. 4(b), the spacing element extends transverse to the helical groove. The spacing element may be shaped in a number of different ways. The spacing, element preferably has a shape with no sharp corners around which the fiber grating must bend. For example, the spacing element may be cylindrical in shape so that the fiber grating bends around the outer circumferential surface of the cylinder. In some embodiments, a portion of the circumferential surface of the cylindrical spacing element may have a shape that conforms to the outer surface of the retaining element so that the spacing element is more easily securable to the retaining element. Alternatively, this portion of the spacing element contacting the retaining element may be planar so that the retaining element will not roll along the outer surface of the spacing element.

Once the grating has been wound about the retaining element and the spacing element, an adhesive is applied to the two ends of the fiber grating so that they are fixed to the retaining element. Once the adhesive has cured, the spacing element may be removed thus leaving excess length of fiber in the groove that alleviates stress imposed on the fiber grating. FIG. 4(d) shows the portion of the retaining element depicted in FIG. 4(a) with the fiber grating loosely situated in the groove. The groove should have a depth sufficient to ensure that fiber grating will not slip out of the groove even when the excess length of fiber that needs to be accommodated is at a maximum. For example, it has been determined that, for a retaining element having a four inch diameter which is designed to operate over a temperature range from about −40 to +80° C., the groove should be at least 0.02 inches deep.

Figure 4C:
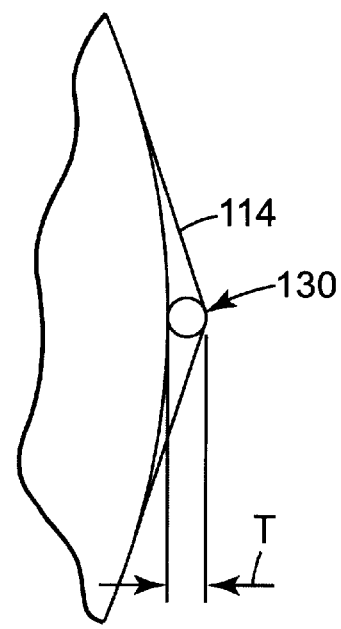
FIG. 4(c) shows a plan view of the retaining element with the fiber grating wound around the retaining element and the spacing element.
Figure 4D:
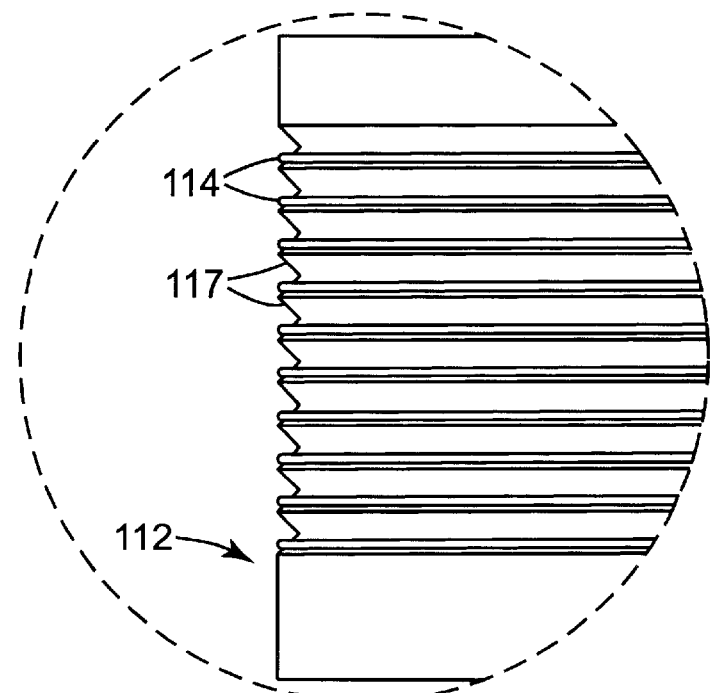
FIG. 4(d) shows the portion of the retaining element depicted in FIG. 4(a) with the fiber grating loosely situated in the groove.

As best shown in FIG. 4(c), the spacing element 130 has a thickness T that determines how much excess length of fiber 114 will be provided in the groove 117 so that the fiber is loosely situated in the groove without any tension. The fiber grating will be more loosely situated in the groove as the thickness T of the spacing element increases. The particular thickness of the spacing element that is selected will depend on a number factors, including the size of the retaining element, the material from which it is formed, and the temperature at which the adhesive is cured. In general, the optimal thickness of the spacing element can be readily determined experimentally. Since the tension on the fiber increases at increasing temperatures, the fiber preferably will be arranged so that a small amount of tension will be exerted at a temperature just above the maximum operating temperature to which the fiber will be exposed. Accordingly, the fiber will be under substantially no stress at all operating temperatures.

In an alternative embodiment of the invention, the stress on the fiber grating may be alleviated without a spacing element by winding the fiber grating around the retaining element and securing it thereto after the retaining element is heated to its maximum operating temperature. As a result, the fiber grating will experience little or no tension at all temperatures below its maximum operating temperature.

EXAMPLES 1–3

EXAMPLES 1–3 demonstrate the wavelength shift of the reflected waveband as a function of temperature for fiber grating packages made in accordance with the present invention.

Fiber grating packages of the type depicted in FIGS. 2–3 were evaluated by determining the amount of tension they experienced at different temperatures. The retaining element employed in this example had a diameter of 4.125 inches, and the helical groove was v-shaped with a depth of about 0.02 inches. The tension was determined by measuring the wavelength shift of the reflected waveband at different temperatures.

In EXAMPLE 1, the grating was wound about the retaining element at room temperature with substantially no excess fiber in accordance with a conventional securing technique. As a result, the fiber grating was under tension at all temperatures above room temperature.

In EXAMPLE 2, the fiber grating was secured to the retaining element at an elevated temperature of 70° C. so that the fiber grating was subject to a small amount of tension at this temperature and substantially no tension at lower temperatures.

In EXAMPLE 3, the fiber grating was secured to the retaining element with a spacing element as previously described. The spacing element was cylindrically shaped and had a diameter of about 0.01 inches.

The wavelength shifts for the above noted arrangements were measured over the range of about 0° C. and 60° C. The results are depicted graphically in FIG. 5. For comparison, the wavelength shift of an unmounted fiber grating is also given.

Figure 5:
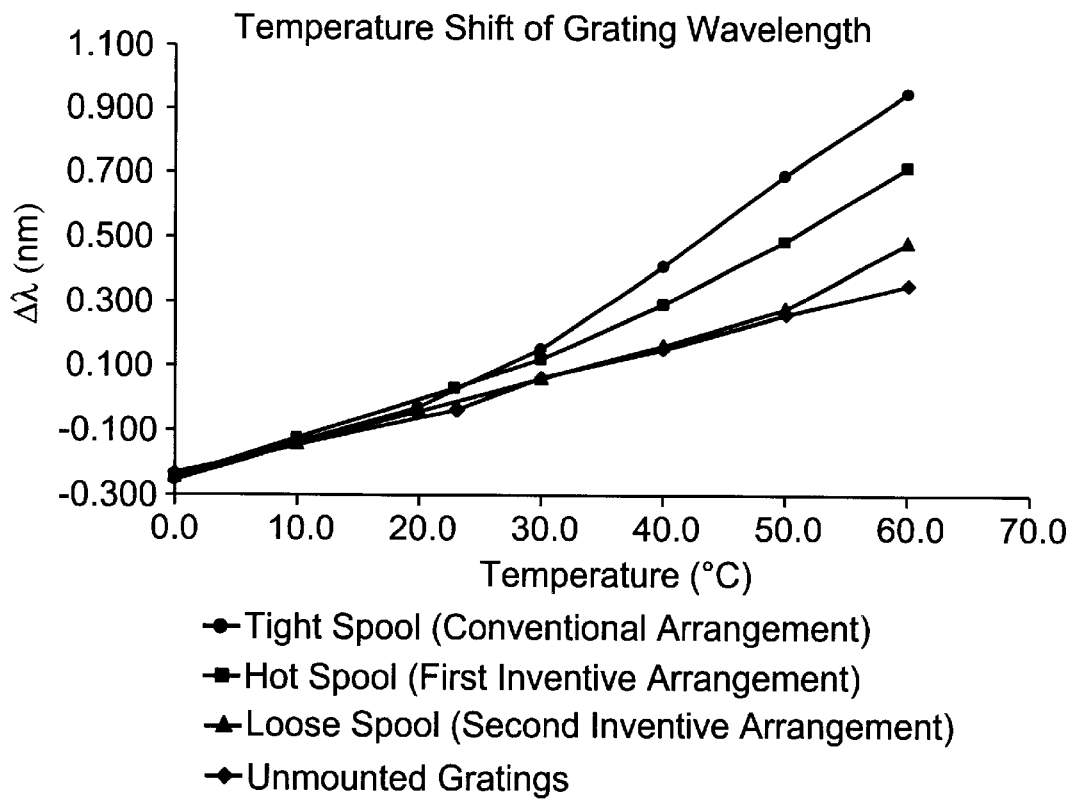
FIG. 5 shows the wavelength shift of the waveband reflected by the fiber Bragg grating between about 0° C. and 60° C. for a number of different arrangements securing the fiber grating to the retaining element.

The temperature dependence of the wavelength shifts shown in FIG. 5 comprise two components, one due to the thermal expansion coefficient of the retaining element and the other due to the temperature dependent properties (i.e., thermal expansion coefficient and refractive index) of the fiber grating itself. In order to examine the wavelength shifts attributable only to the expansion coefficient of the retaining element, the wavelength shift of the unmounted fiber should be subtracted from each set of data shown in FIG. 5. This result is shown in FIG. 6.

Figure 6:
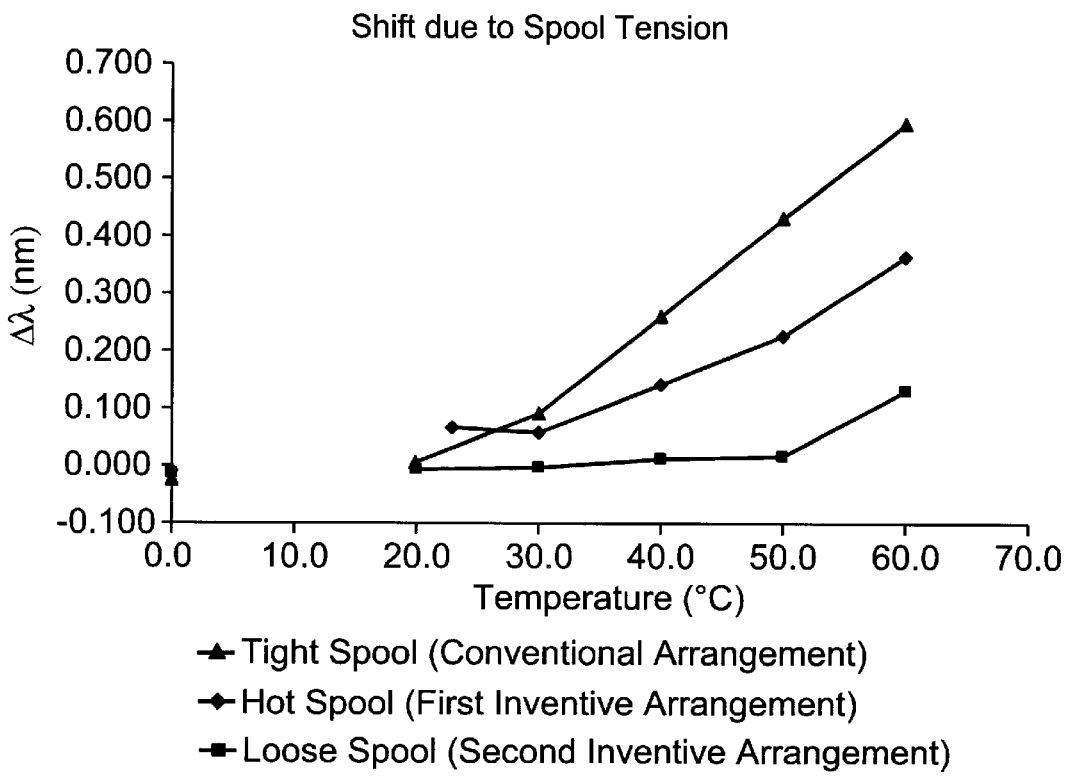
FIG. 6 shows the portion of the wavelength shifts shown in FIG. 5 that is attributable to the thermal expansion coefficient of the retaining element.

FIG. 6 shows the wavelength shift of the reflected waveband attributable to the thermal expansion coefficient of the retaining element for each of the arrangements shown in FIG. 5. In the conventional arrangement, in which the fiber was under tension at temperatures above room temperature, the wavelength shift, as expected, increases relatively rapidly at temperatures above about 20° C. In the arrangement of EXAMPLE 2, in which the fiber was not subject to significant tension until about 70° C., the wavelength shift did not begin until about 30° C. (indicating that the fiber was not subject to significant tension at lower temperatures), above which the wavelength shift increased appreciably but at a rate less than in the conventional arrangement. In the arrangement of EXAMPLE 3, however, the wavelength shift is negligible until about 50° C., above which it increases, but at a rate significantly less than in the other two cases. Accordingly, the arrangements of EXAMPLES 2 and 3 both imposed less tension on the fiber grating than that experienced with the conventional technique. Nevertheless, the arrangements of EXAMPLES 2–3 did not provide equal results. Specifically, a comparison of the two arrangements shows that winding the fiber grating around a spacing element provided superior results to winding the fiber grating around the spacing element at elevated temperatures. In principle, however, both inventive techniques should be able to provide equally superior results by more precisely controlling various parameters such as the temperature of the retaining element and the tension imposed on the fiber grating when it is wound around the retaining element at an elevated temperature.

It is possible to improve the results attainable with the gratings packages of the present invention beyond those depicted in FIG. 6 by using, for example, a thicker spacing element 130 so that additional excess length of fiber is provided in the groove 117. In such a case, the fiber grating can be exposed to even higher temperatures than shown in FIG. 6, while maintaining minimal stress on the grating. Alternatively, this same result can be achieved by using more than one spacing element.

As previously mentioned, in some cases it is desirable to minimize the temperature gradient on the fiber grating so that, while the reflected waveband may be shifted, it will not also be distorted. An example of such a package is disclosed in Copending Appl. Serial No. 09/524,862, entitled "Thermally Managed Package for Fiber Optic Bragg Gratings" and filed on even date herewith now U.S. Pat No. 6,226,438, which features a relatively low thermal conductivity housing and a relatively high thermal conductivity retaining element. Such an arrangement ensures that the temperature of the Bragg grating remains substantially uniform even when the ambient temperature undergoes substantial fluctuations. The present invention may be employed in a package of this type so that the fiber Bragg grating remains at a substantially uniform temperature while substantially no strain is imparted to the grating even as the ambient temperature fluctuates. For example, the retaining element shown in FIG. 2 may be formed from a high thermally conducting material such as copper, which has a thermal conductivity of 401 W/m-K. The housing may be a thermally insulating housing formed from any of a number of materials, including a variety of different plastics. One such plastic, which is believed to be a polystyrene/polypropylene blend or alloy, is currently available from the Dow Chemical Company, Midland, Mich. under the trade name Questra™. Another suitable plastic is a resin available from Ciba-Geigy Corporation, Greensboro, N.C. under the trade name Cibatool®, which has a thermal conductivity of 0.2002 W/m-K.

The preceding description of the present invention is merely illustrative, and is not intended to be limiting. Therefore, the scope of the present invention should be construed solely by reference to the appended claims.

What is claimed is:

1. A method for securing an optical fiber having a Bragg grating to a retaining element having a helical groove, said method comprising the steps of:

wrapping the optical fiber around the retaining element so that the optical fiber extends in and along the helical groove;

providing an excess length of the optical fiber in the helical groove to substantially alleviate tension exerted upon the optical fiber; and affixing first and second ends of the optical fiber to the retaining element such that the Bragg grating is between said affixing points.

2. The method of claim 1, wherein the step of providing the excess length of the optical fiber includes the step of wrapping the optical fiber around the retaining element so that substantially no tension is exerted upon the Bragg orating until a maximum temperature is exceeded.

3. The method of claim 2, wherein the maximum temperature corresponds to a maximum operating temperature of optical fiber having the Bragg grating.

4. The method of claim 1, wherein the step of providing the excess length of the optical fiber further includes a step of securing a spacing element across a plurality of lays of the helical groove and the wrapping step includes the step of wrapping the optical fiber around both the retaining element and the spacing element so that the optical fiber extends in and along the helical groove.

5. The method of claim 4 wherein the spacing element has a generally convex surface about which the optical fiber is wrapped.

6. The method of claim 4, wherein the spacing element is generally cylindrical in shape.

7. The method of claim 6, wherein the helical groove is located in an outer surface of the retaining element and the cylindrical spacing element has a portion of its circumferential surface that conforms to said outer surface of the retaining element.

8. The method of claim 6, wherein the cylindrical spacing element has a portion of its circumferential surface that is substantially planar for contacting an outer surface of the retaining element.

9. The method of claim 1, wherein the optical fiber having the Bragg grating is affixed to the retaining element with adhesive.

10. The method of claim 9, further comprising the step of removing the spacing element after affixing the first and second ends of the optical fiber to the retaining element such that the Bragg grating is between said affixing points.

11. The method of claim 1, wherein the step of wrapping the optical fiber having the Bragg grating around the retaining element is performed while the retaining element is at a temperature above normal room temperature.

12. The method of claim 11, wherein said temperature at which the optical fiber is wrapped around the retaining element corresponds to a maximum operating temperature of the Bragg grating.

13. A method for securing an optical fiber having the Bragg grating to a retaining element having a helical groove that includes a plurality of lays, said method comprising the steps of:

securing a spacing element across the plurality of lays of the helical groove;

wrapping the optical fiber around the retaining element and the spacing element so that the optical fiber extends in and along the helical groove;

affixing first and second ends of the optical fiber to the retaining element such that the Bragg grating is between said affixing points; and removing the spacing element so that an excess length of the optical fiber remains in the helical groove to substantially alleviate tension exerted upon the optical fiber.

14. The method of claim 13, wherein the step of providing the excess length of the optical fiber includes the step of wrapping the optical fiber around the retaining element so that substantially no tension is exerted upon the Bragg grating until a maximum temperature is exceeded.

15. The method of claim 14, wherein the maximum temperature corresponds to a maximum operating temperature of the Bragg grating.

16. The method of claim 13, wherein the optical fiber is affixed to the retaining element with adhesive.

17. The method of claim 13, wherein the spacing element has a generally convex surface about which the optical fiber is wrapped.

18. The method of claim 13, wherein the spacing element is generally cylindrical in shape.

19. The method of claim 18, wherein the helical groove is located in an outer surface of the retaining element and the cylindrical spacing element has a portion of its circumferential surface that conforms to said outer surface of the retaining element.

20. The method of claim 18, wherein the cylindrical spacing element has a portion of its circumferential surface that is substantially planar for contacting an outer surface of the retaining element.

* * * * *